3,086,032
Patented Apr. 16, 1963

1

3,086,032
HYDROHALOGENATION OF 9,11-EPOXY STEROIDS
Herbert A. Gerber, Mount Freedom, N.J., assignor to Schering Corporation, Bloomfield, N.J., a corporation of New Jersey
No Drawing. Filed Feb. 6, 1961, Ser. No. 87,080
8 Claims. (Cl. 260—397.45)

This invention is concerned with a process for the conversion of a 9,11-epoxy steroid into the corresponding 9-halo-11-hydroxy steroid. More particularly, this invention relates to an improved process for the preparation of 9α-chloro-11β-hydroxy and 9α-fluoro-11β-hydroxy steroids by the treatment of the corresponding 9,11-epoxy steroid with an aqueous solution of the appropriate hydrogen halide.

It has, of course, long been known that such 9-halo-11-hydroxy steroids as 9α-fluorocortisone, 9α-fluorohydrocortisone, 9α-fluoroprednisone and 9α-fluoroprednisolone and the 16α- and 16β-methyl and 21-ester derivatives thereof display an anti-inflammatory activity far greater than that afforded by the corresponding 9-des-halo compounds. Previous attempts to prepare these and other therapeutically valuable 9-halo-11-hydroxy steroids have involved treatment of the corresponding 9,11-epoxides with both anhydrous and aqueous hydrogen fluoride. Both of these processes, however, have had unsatisfactory aspects. It has been reported that reaction of 9,11-epoxides with anhydrous hydrogen halide in chloroform proceeds slowly and results in low yields of impure product. Attempts to overcome these difficulties by conducting the reaction in an aqueous medium have also been reported to be unsatisfactory due to the relative insolubility of the steroid in such aqueous media.

By employing the process of the instant invention, the difficulties heretofore encountered have been largely overcome. Accordingly, it is the object of this invention to provide an improved process for the conversion of a 9,11-epoxy steroid into the corresponding 9-chloro-11-hydroxy or 9-fluoro-11-hydroxy steroid. It is a further object of this invention to provide an improved method for the preparation of 9α-chloro-11β-hydroxy and 9α-fluoro-11β-hydroxy steroids from the corresponding 9,11-epoxides wherein the epoxide is treated with an aqueous solution of the appropriate hydrogen halide under conditions which result in the formation of the desired 9α-halo-11β-hydroxy steroid in high and relatively pure yield.

It has now been discovered that by treating a soluble 9,11-epoxy steroid such as, for example, 16α-methyl-9β,11β-oxido-1,4-pregnadiene-17α,21-diol-3,20-dione with a 30% to 38% (w./w.) aqueous solution of hydrogen chloride or a 48% to 79% (w./w.) aqueous solution of hydrogen fluoride at a temperature of from −30° to plus 35° C., the corresponding 9α-halo-11β-hydroxy compound is formed in higher yield and purity than was heretofore possible. The concentration of hydrogen halide is calculated on a weight to weight (w./w.) basis. By soluble 9β,11β-epoxy steroid is meant such steroid which is soluble in the hydrogen halide reagent to the extent of at least 3 parts by weight of steroid per 100 parts by weight of hydrogen halide reagent. Thus, the aqueous hydrogen halide acts as a solvent for the steroid as well as a hydrohalogenation reagent.

The concentration of the aqueous hydrogen halide solution is of critical importance in the process of the instant invention. It has been found that concentrations of hydrogen halide below 30% (HCl) and 48% (HF) give incomplete conversion of the epoxide. Using aqueous hydrogen fluoride in concentrations above 79% results in decreased yields while concentrations of hydrogen chloride substantially above 38% are so difficult to obtain as to render them of no practical value in the instant process. Only tars and oils are obtained when using anhydrous hydrogen fluoride at −20° C. Concentrated hydrochloric acid (37% w./w.) and hydrofluoric acid (70% w./w.) are preferred reagents and are readily available commercially.

In general, the process of the instant invention is carried out by treating the soluble 9β,11β-epoxy steroid (one part by weight) with from two to twenty parts (by weight) of aqueous hydrogen halide solution at a concentration and a temperature within the ranges specified above. The time of reaction depends largely upon the other reaction conditions such as the temperature and the concentration of hydrogen halide. The optimum reaction time falls in the range of 5 minutes to 24 hours.

Upon completion of the reaction, the reaction mixture, which is usually a complete solution, is poured into water containing sufficient potassium carbonate, or equivalent inorganic base, to completely neutralize the unreacted hydrogen halide. The resulting crude precipitate is filtered and recrystallized from a suitable organic solvent for the steroid such as acetone, ethyl acetate etc. The yields obtainable from the above process usually range from 70% to 80% of pure product.

The process of the instant invention is one of general applicability and may be used to convert any soluble 9,11-epoxy steroid into the corresponding 9α-chloro-11β-hydroxy or 9α-fluoro-11β-hydroxy compound. These soluble 9,11-epoxy steroids and the methods for their preparation are, of course, well known in the art. Particularly desirable 9α-halo-11β-hydroxy derivatives are prepared from the corresponding soluble 9,11-epoxy steroids of the pregnane series.

The following examples are set forth as further and more particular illustrations of the process of the instant invention. It is to be understood, however, that no limitation is intended except as defined by the appended claims.

EXAMPLE 1

*9α-Chloro-16α-Methyl-1,4-Pregnadiene-11β,17α,21-Triol-3,20-Dione*

To 10 g. of 16α-methyl-9β,11β-oxido-1,4-pregnadiene-17α,21-diol-3,20-dione is added 200 mls. of concentrated HCl (37% w./w.). As soon as the steroid dissolves (5 minutes), 200 mls. of water is added and the mixture agitated for 4 hours at room temperature. The reaction mixture is then poured into 500 mls. of water containing 400 g. of potassium carbonate. The crude product precipitates and is separated by filtration. Recrystallization from acetone gives the desired 9α-chloro-16α-methyl-1,4-pregnadiene-11β,17α,21-triol-3,20-dione.

EXAMPLE 2

*9α-Fluoro-16α-Methyl-1,4-Pregnadiene-11β,17α,21-Triol-3,20-Dione*

To 10 g. of 16α-methyl-9β,11β-oxido-1,4-pregnadiene-17α,21-diol-3,20-dione is added 250 mls. of aqueous hydrogen fluoride (70% w./w.). The reaction mixture is agitated for 3½ hours at −20° C. The resulting solution is slowly added to 1 l. of water containing 880 g. of potassium carbonate. The mixture is agitated for 10 minutes and the resulting precipitate is separted by filtration and washed neutral with water. The crude product is recrystallized from acetone to give 86.8 g. (82.5% of theory) of pure 9α-fluoro-16α-methyl-1,4-pregnadiene-11β,17α,21-triol-3,20-dione.

I claim:
1. In a process for the preparation of a 9α-halo-11β- hydroxy steroid by reaction of a hydrogen halide with the corresponding 9β,11β-epoxy steroid, the improvement which comprises treating a soluble 9β,11β-epoxy steroid with a solution consisting of a hydrogen halide and water; said hydrogen halide being a member of the group consisting of hydrogen chloride and hydrogen fluoride in respective concentrations of about 30% to about 38% and about 48% to about 79% calculated on a weight to weight basis.

2. The process of claim 1 wherein the reaction is carried out at a temperature range of from about −30° C. to about plus 35° C.

3. The process of claim 1 wherein the aqueous hydrogen halide is 37% (w./w.) hydrogen chloride.

4. The process of claim 1 wherein the aqueous hydrogen halide is 70% (w./w.) hydrogen fluoride.

5. The process which comprises reacting 16α-methyl-9β,11β - oxido - 1,4 - pregnadiene - 17α,21 - diol - 3,20-dione with a solution consisting of 37% (w./w.) hydrogen chloride in water thereby producing 9α-chloro-16α-methyl-1,4-pregnadiene-11β,17α,21-triol-3,20-dione.

6. The process which comprises reacting 16α-methyl-9β,11β-oxido-1,4-pregnadiene-17α,21-diol-3,20-dione with a solution consisting of 70% (w./w.) hydrogen fluoride in water thereby producing 9α-fluoro-16α-methyl-1,4-pregnadiene-11β,17α,21-triol-3,20-dione.

7. The process which comprises reacting 16β-methyl-9β,11β - oxido - 1,4 - pregnadiene - 17α,21 - diol - 3,20-dione with a solution consisting of 70% (w./w.) hydrogen fluoride in water thereby producing 9α-fluoro-16β-methyl-1,4-pregnadiene-11β,17α21-triol-3,20-dione.

8. The process which comprises reacting 9β,11β-oxido-1,4 - pregnadiene - 16α,17α,21 - triol - 3,20 - dione 16,21-diacetate with a solution consisting of 70% (w./w.) hydrogen fluoride in water thereby producing 9α-fluoro-1,4 - pregnadiene - 11β,16α,17α,21 - tetraol - 3,20-dione 16,21-diacetate.

References Cited in the file of this patent
UNITED STATES PATENTS

| | | |
|---|---|---|
| 2,957,894 | Wettstein et al. | Oct. 25, 1960 |
| 2,964,542 | Spero | Dec. 13, 1960 |
| 2,975,172 | Fried | Mar. 14, 1961 |
| 2,989,550 | Nathan et al. | June 20, 1961 |
| 3,010,957 | Nobile | Nov. 28, 1961 |
| 3,014,973 | Ringold et al. | Dec. 26, 1961 |
| 3,022,295 | Berg et al. | Feb. 20, 1962 |